United States Patent
Sato et al.

(10) Patent No.: US 8,322,860 B2
(45) Date of Patent: Dec. 4, 2012

(54) PROJECTOR APPARATUS AND METHOD OF CONTROLLING THE COLOR FLUCTUATION OF THE LIGHT

(75) Inventors: Osamu Sato, Kumagaya (JP); Shuji Otake, Akiruno (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 360 days.

(21) Appl. No.: 12/689,865

(22) Filed: Jan. 19, 2010

(65) Prior Publication Data

US 2010/0188588 A1  Jul. 29, 2010

(30) Foreign Application Priority Data

Jan. 26, 2009  (JP) ................. 2009-014561
May 29, 2009  (JP) ................. 2009-130587

(51) Int. Cl.
  G03B 21/16  (2006.01)
  G03B 7/00  (2006.01)
  H04N 9/73  (2006.01)
  G05D 23/00  (2006.01)
  H01S 3/04  (2006.01)

(52) U.S. Cl. .......... 353/52; 348/655; 345/101; 165/253; 165/287; 372/34; 396/225

(58) Field of Classification Search .......... 353/52; 348/655, 241; 345/101; 165/253, 287; 372/34; 396/225

See application file for complete search history.

(56) References Cited

U.S. PATENT DOCUMENTS

| RE36,060 | E | * | 1/1999 | Miyashita ............. 348/748 |
| 6,971,751 | B2 | | 12/2005 | Wang |
| 2004/0201828 | A1 | | 10/2004 | Wang |
| 2004/0257535 | A1 | * | 12/2004 | Tanaka et al. ............. 353/31 |
| 2007/0004512 | A1 | | 1/2007 | Toyoda |
| 2008/0259289 | A1 | * | 10/2008 | Nozaki et al. ............. 353/70 |

FOREIGN PATENT DOCUMENTS

| JP | 61-140933 | 6/1986 |
| JP | 7-296981 | 11/1995 |
| JP | 2002-64223 | 2/2002 |
| JP | 2004-163527 | 6/2004 |
| JP | 2004-226631 | 8/2004 |

(Continued)

OTHER PUBLICATIONS

Japanese Patent Application No. 2009-130587, Notification of Reasons for Rejection, mailed Mar. 16, 2010, (English Translation).

(Continued)

*Primary Examiner* — Tony Ko
*Assistant Examiner* — Magda Cruz
(74) *Attorney, Agent, or Firm* — Blakley, Sokoloff, Taylor & Zafman LLP

(57) ABSTRACT

According to one of embodiment, an apparatus for image projecting and a method for controlling color fluctuation of light are acquired the temperatures of a plurality of light sources configured to emit light beams of different colors or the temperature at a position near the light-emitting elements, set an amount of light each of the light sources emits, in accordance with the temperature acquired of the light source, and set at least one of the color and brightness of the image to be projected. The fluctuation of the color or brightness of the image to be projected can therefore be controlled.

5 Claims, 9 Drawing Sheets

FOREIGN PATENT DOCUMENTS

| | | |
|---|---|---|
| JP | 2004-310094 | 11/2004 |
| JP | 2006-93822 | 4/2006 |
| JP | 2006-154016 | 6/2006 |
| JP | 2006-223588 | 8/2006 |
| JP | 2007-108205 | 4/2007 |
| JP | 2007-147870 | 6/2007 |
| JP | 2007-156438 | 6/2007 |
| JP | 2008-145486 | 6/2008 |
| JP | 2008-177107 | 7/2008 |
| JP | 2008-185924 | 8/2008 |
| JP | 2008-193054 | 8/2008 |
| WO | 2008-093462 | 8/2008 |

OTHER PUBLICATIONS

Japanese Patent Application No. 2009-130587, Notice of Reasons for Rejection, mailed Jun. 15, 2010, (English Translation).

* cited by examiner

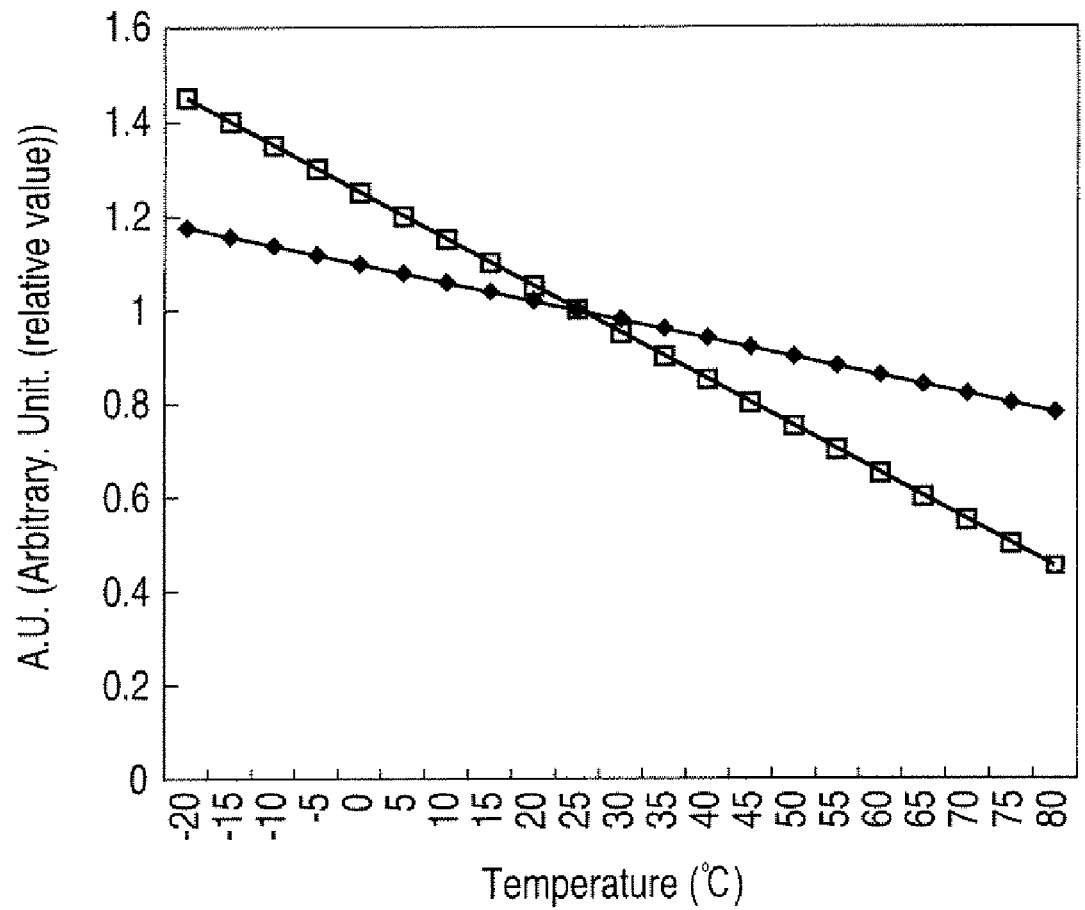
F I G. 5

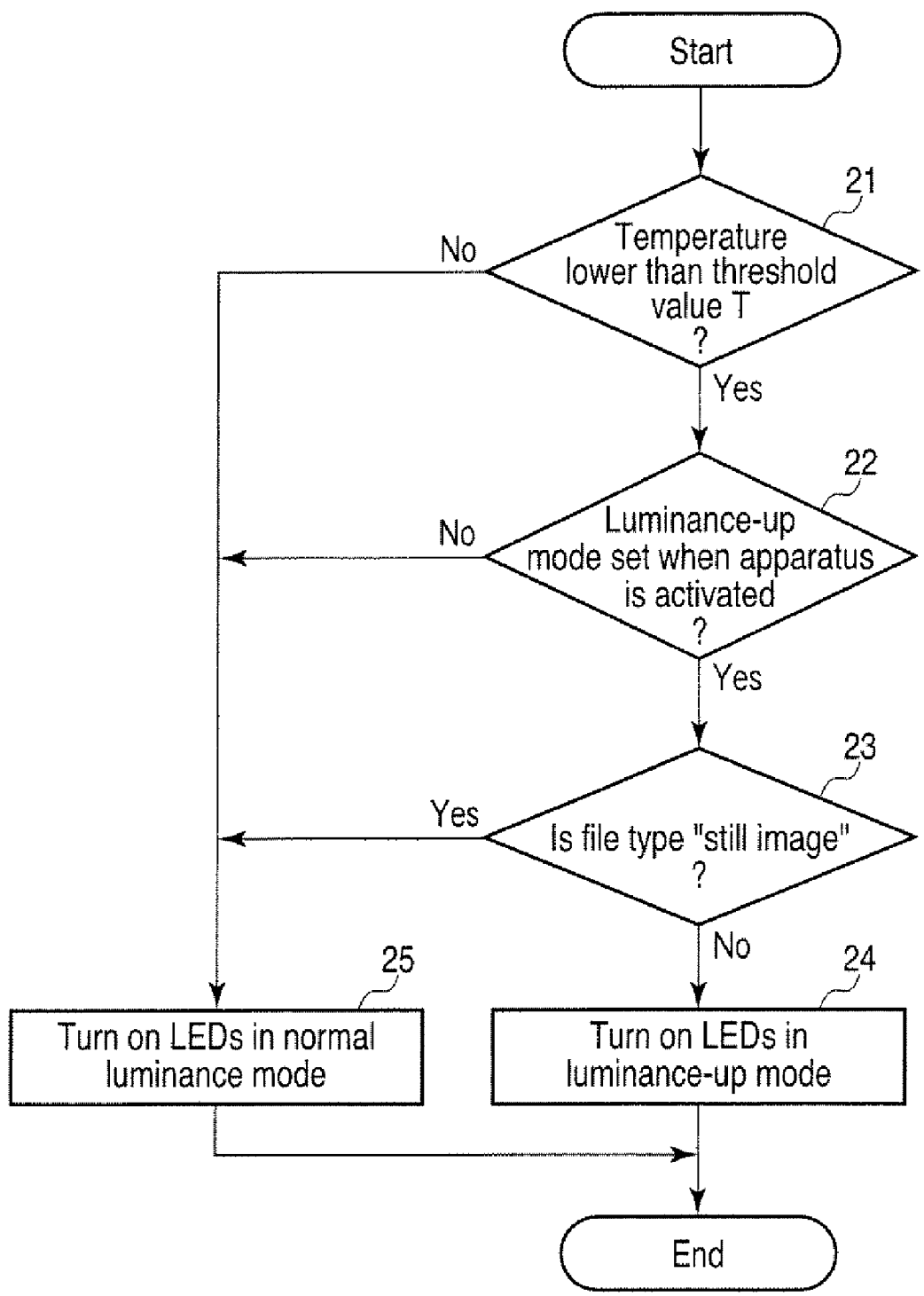
F I G. 10

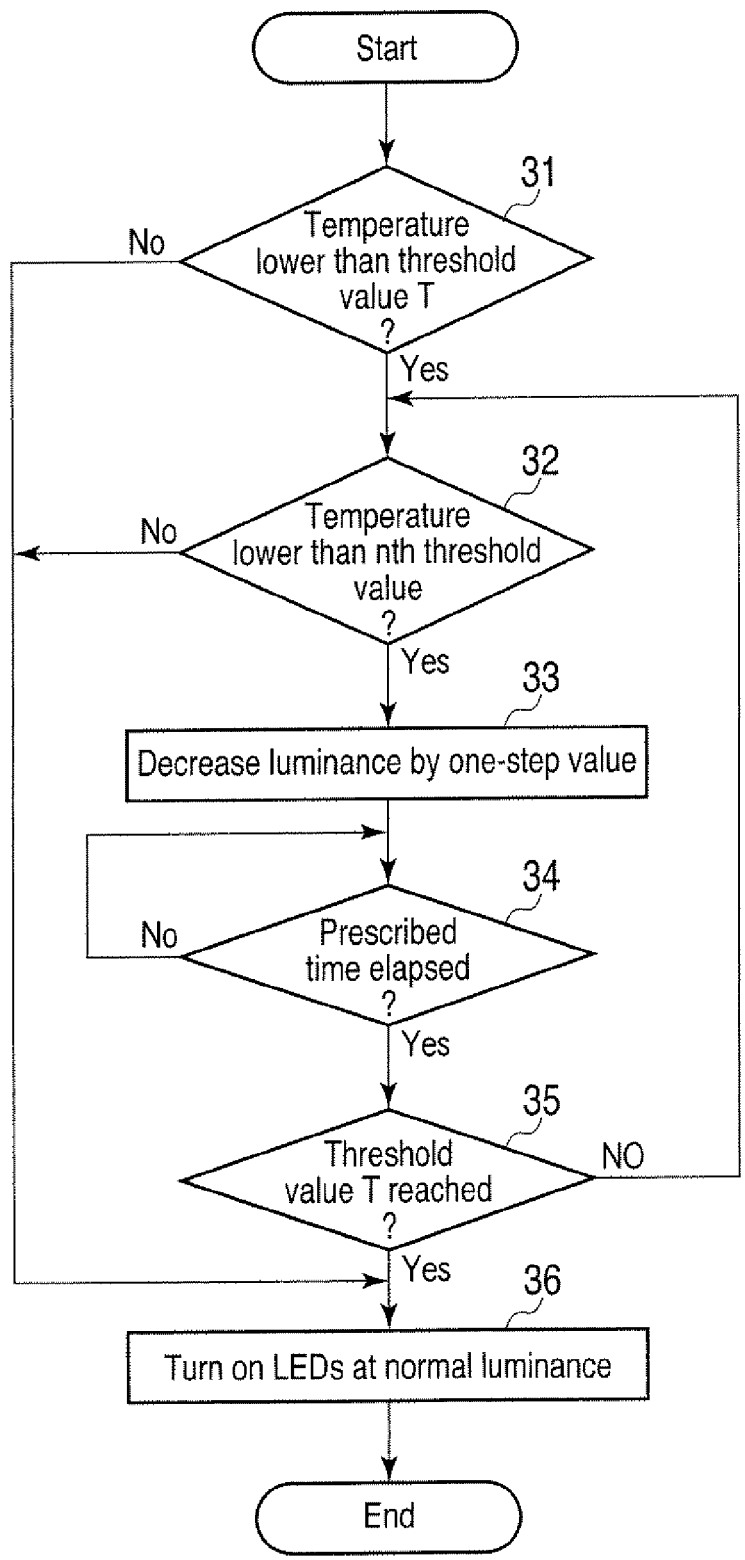
F I G. 11

PROJECTOR APPARATUS AND METHOD OF CONTROLLING THE COLOR FLUCTUATION OF THE LIGHT

CROSS-REFERENCE TO RELATED APPLICATIONS

This application is based upon and claims the benefit of priority from Japanese Patent Applications No. 2009-014561, filed Jan. 26, 2009; and No. 2009-130587, filed May 29, 2009, the entire contents of both of which are incorporated herein by reference.

BACKGROUND

1. Field

The present invention relates to a projector apparatus using LEDs as light source, and to a method of controlling the color fluctuation of the light output from the apparatus.

2. Description of the Related Art

Portable and small electronic apparatuses such as mobile telephones have been proposed, which have a projector function of projecting images.

As is known in the art, the output light of any portable projector apparatus changes in color (hue), resulting from the difference in characteristic between the LEDs that are used as light source.

Japanese Patent Application Publication (KOKAI) No. 2006-93822 (Reference 1) discloses the technique of changing the three elements of white light coming from an LED light source, i.e., a red (R) beam, green (G) beam and blue (B) beam, thereby to adjust the color of the image being projected.

Japanese Patent Application Publication (KOKAI) No. 2006-223588 (Reference 2) discloses the technique of reducing the optical output of the light source when the temperature rises to a prescribed value or beyond after the illumination switch has been turned on.

Japanese Patent Application Publication (KOKAI) No. 2002-64223 (Reference 3) discloses the control technique of increasing the luminance of light-emitting elements, at normal temperature.

Reference 1 indeed teaches that an image is projected to "detect the hue" or to "detect the contrast," and to photograph the image and compare the characteristic of the image with a reference characteristic. Reference 1, however, does not disclose that the colors (R, G and B) the LEDs of the LED light source may output are predicted before they are actually output.

Reference 2 or Reference 3 does not suggest whether the luminance is set high or normal in accordance with the temperature detected when the LED start emitting light.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 5 is an exemplary diagram showing an example of a temperature-intensity relationship of each LED element of a LED light source that may be used in the projector (mobile telephone) shown in FIGS. 1 and 2, according to an embodiment of the invention;

FIG. 10 is an exemplary flowchart explaining an exemplary method of driving the projector, not setting the same to the luminance-up mode in which the luminance is increased when the projector is activated, by utilizing the temperature characteristics of FIG. 8, according to an embodiment of the invention; and FIG. 11 is an exemplary a flowchart explaining an exemplary sequence of terminating the luminance-up mode in which the luminance is increased when the projector is activated, by utilizing the temperature characteristics of FIG. 8, according to an embodiment of the invention.

DETAILED DESCRIPTION

Various embodiments according to the invention will be described hereinafter with reference to the accompanying drawings. In general, according to one embodiment of the invention, a projector apparatus comprising: a light source configured to emit light and including light-emitting elements; an image forming module configured to perform spatial modulation on light beams of different color components, emitted by the light source, in accordance with video data items corresponding to the color components, thereby forming an image consisting of the color components; a temperature detecting module configured to detect the temperature of the light-emitting elements or the temperature at a position near the light-emitting elements; a light-source drive module configured to correct the intensity of each color component emitted by the light source emits, in accordance with the temperature detected by the temperature detecting module;

and a projection optical system configured to project the image formed by the image forming module toward a screen.

Embodiments of this invention will now be described hereinafter in detail with reference to the accompanying drawings.

Figure 1:
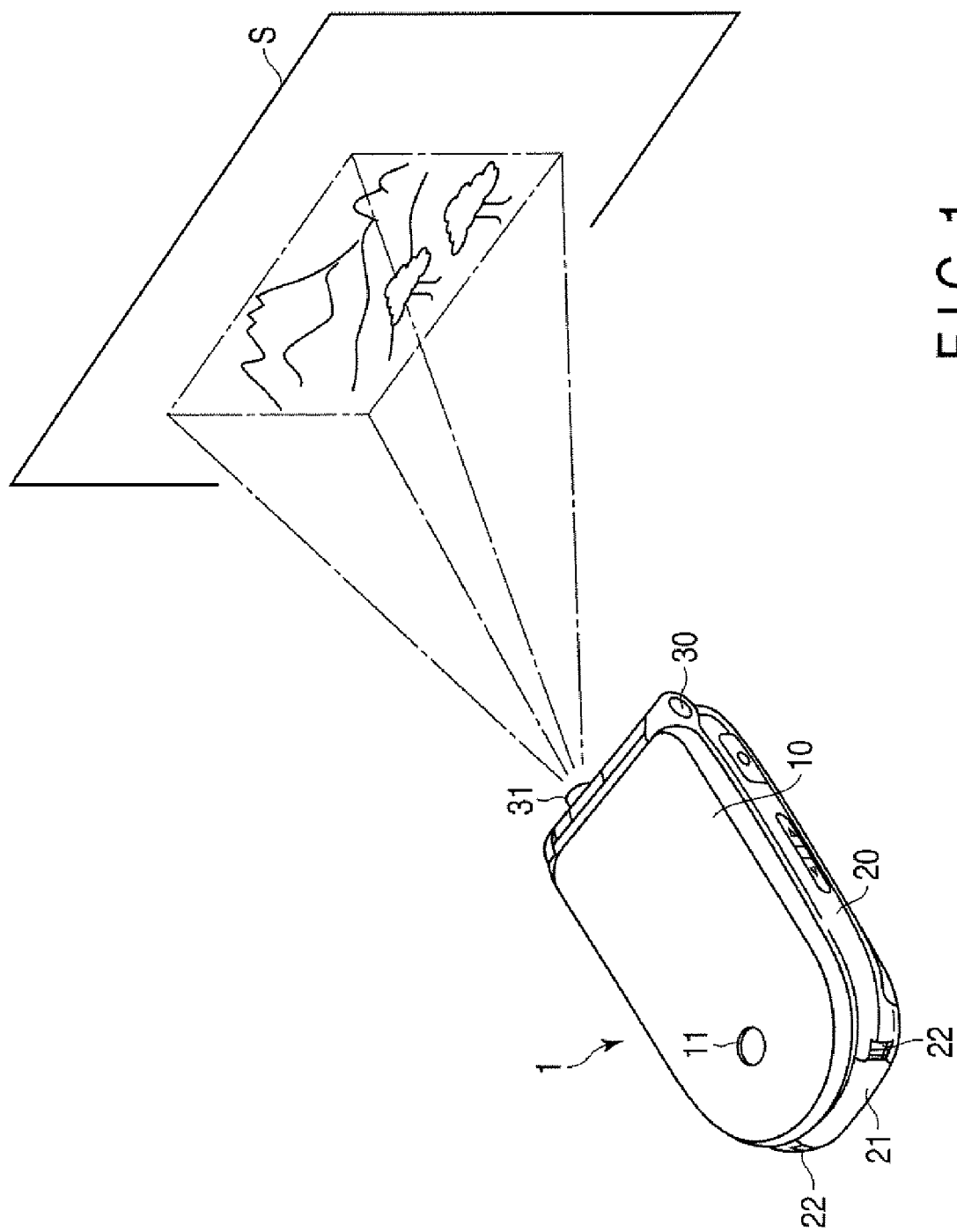
FIG. 1 is an exemplary diagram showing an example of the concept of projecting a given image onto a screen by a projector (mobile telephone) according to an embodiment of the present invention.

FIG. 1 is a diagram showing an exemplary portable electronic apparatus with a projector function, to which an embodiment of this invention can be applied. The portable electronic equipment is a mobile telephone. Nevertheless, the portable electronic apparatus may instead be a digital still camera, a camera having a printer, or a portable music player, as long as the apparatus has a function of projecting images and uses LEDs (R, G, B) as light sources. Further, the portable electronic apparatus may be an external apparatus that can exchange the data representing images to project with any apparatus by means of wired or wireless communication.

The mobile telephone (projector) 1 having the function of projecting images comprises a display unit 10, and a main unit 20, and connection unit 30. The display unit 10 holds a liquid crystal display (LCD) panel or an electroluminescent (EL) panel and an imaging lens. The connection unit 30 connects the display unit 10 to the main unit 20, enabling the display unit 10 to rotate with respect to the main unit 10, between an opened position and a closed position. On the connection unit 30 or at a position near the connection unit 30, a projection lens 31 is located. The projection lens 31 can project images while the mobile telephone 1 is operating as projector. The projection lens 31 is so positioned with respect to the main unit 20 that the projected image may lie almost horizontal if the main unit 10 is laid on a horizontal plane (e.g., on a desk), with the display unit 20 held in the closed position. Hence, once the user has selected an image to project as will be explained later with reference to FIG. 2, the mobile telephone can be placed on, for example, a desk, with the display unit 10 remaining in the closed position. If the mobile telephone 1 is so placed, the image displayed on the display unit 10 can be concealed from the user's view field, not annoying the user who is now looking at the image projected onto the screen S.

The display unit 10 has an imaging lens 11 through which video data representing a still or moving image photographed. The imaging lens 11 is opposed to an object of photography when the user rotates the display unit 10 to an opened position, through a particular angle to the main unit 10, in order to photograph the object.

The main unit 20 has an external connection unit 21. The connection unit 21 has a connector and a card slot. The connector may be used to connect the mobile telephone 1 to an external apparatus so that data may be transferred between the mobile telephone 1 and the external apparatus. The card slot can hold a card-shaped memory, hence removably loading in the main unit 20. The main unit 20 further has a power supplying terminal 22 at a position near the connection unit 21. The power supplying terminal 22 can receive power from a recharging power supply (not shown) or from an external battery apparatus.

Figure 2:
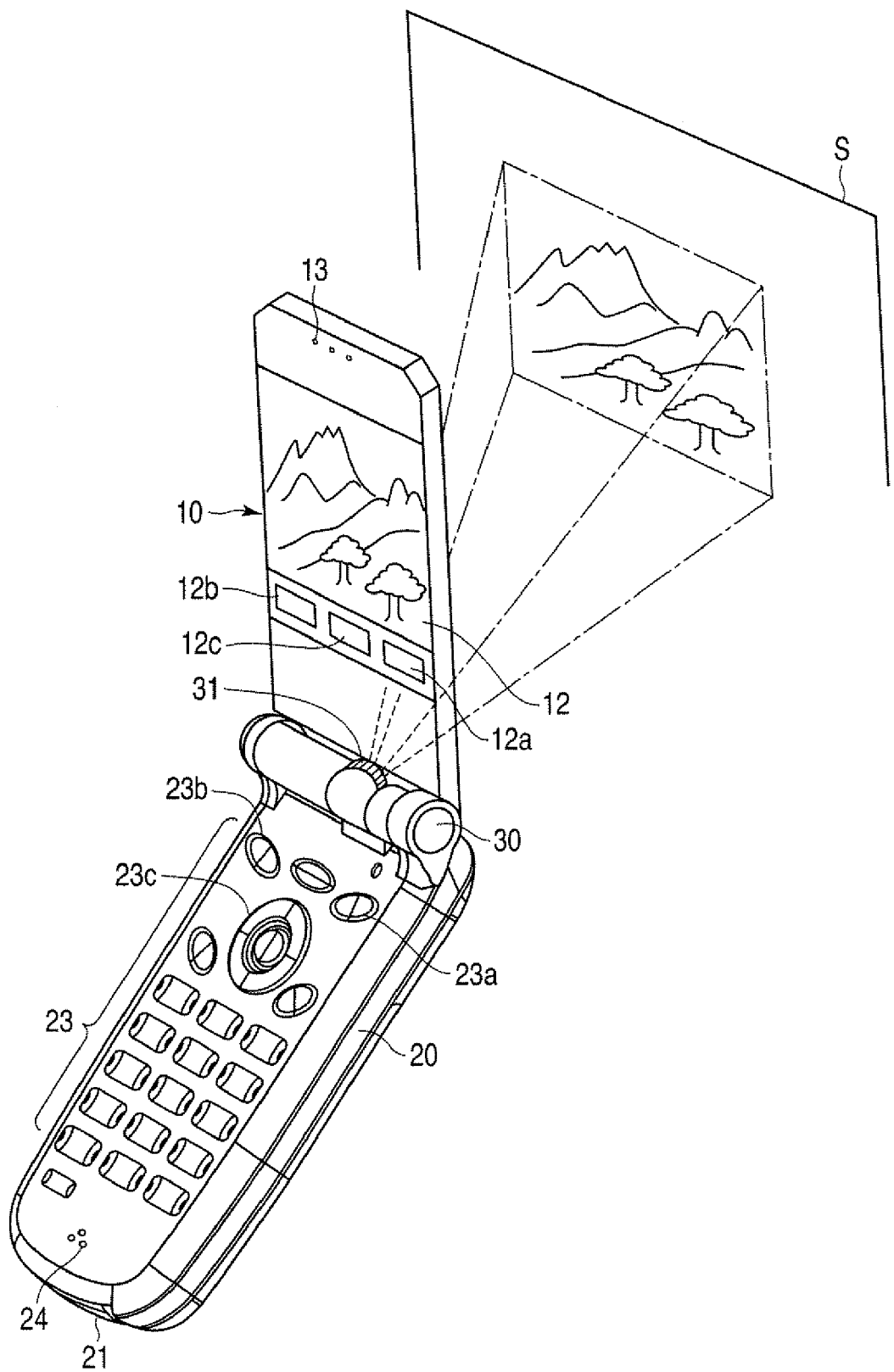
FIG. 2 is an exemplary diagram showing an example of the concept of projecting a given image by the projector (mobile telephone) shown in FIG. 1, according to an embodiment of the invention.

FIG. 2 shows how the projector (mobile telephone) of FIG. 1 is operated to select an image to project and the image thus projected onto the screen S. Any component called "module" hereinafter may be implemented as hardware or software. If the modules are implemented as software, a CPU (microcomputer) will be used.

On that surface of the display unit 10, which opposes the main unit 20, a display 12 and a speaker 13 are provided. The display 12 can display the telephone number or mail address of the person the user is calling, the telephone number or mail address of the user calling any person, or the text data or video data being edited or played back. The speaker 13 is used to generate speech or play back music data.

The main unit 20 has an input unit 23 and a microphone 24. The input unit 23 may be used to input numerical data or text data. The microphone 24 may be used to achieve oral communication. The input unit 23 has various keys that may be used to input data, select functions and set the apparatus 1 to an operating mode, though not explained here in detail. The keys include a ten-key pad (for dialing the person to talk with), a transmission key, an end key, a power-supply key, a volume adjusting key, a mode setting key, etc. The input has multi-function keys 23a, 23b and 23c, too. These keys may be operated to input various commands such as a select/return command, a scroll/switch command and an OK command. Thus, the user can input various operating commands he or she finds necessary based on the information displayed on the display 12.

Figure 3:
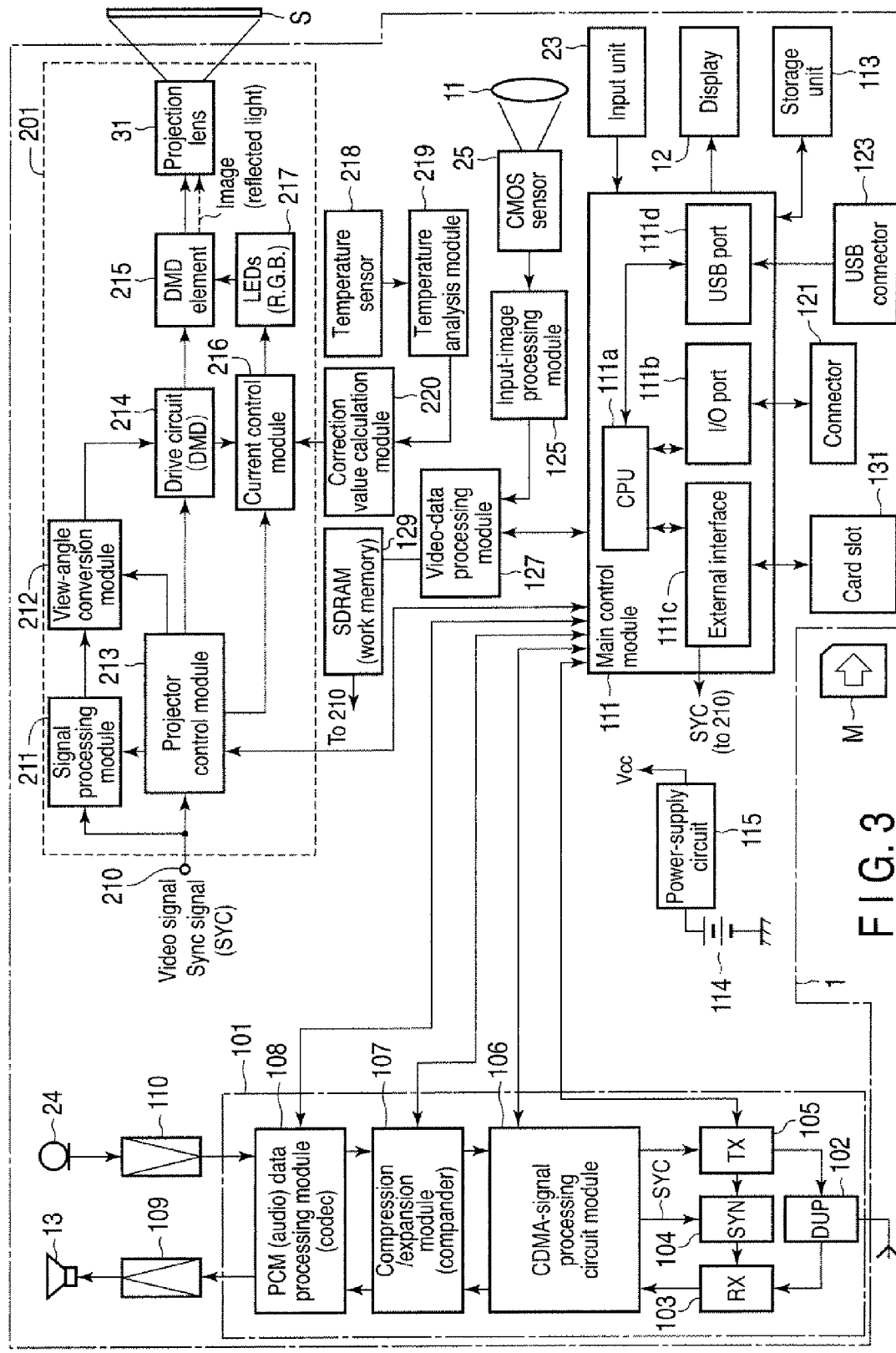
FIG. 3 is an exemplary diagram showing an example of components of the projector (mobile telephone) shown in FIGS. 1 and 2, according to an embodiment of the invention.

FIG. 3 shows an exemplary configuration the portable terminal apparatus (projector) 1 may have.

The portable terminal apparatus 1 has a communication unit 101, which includes an antenna duplexer (DUX) 102, a reception circuit (RX) 103, an intermediate-frequency synthesizer (SYN) 104, a transmission circuit (TX) 105, and a CDMA-signal processing module 106. The CDMA-signal processing unit 106 is connected to at least a compression/expansion module (hereinafter called a compander) 107 and a PCM (audio) data processing module (hereinafter called a PCM codec) 108.

The antenna receives any radio signal transmitted from the base station. The DUP 102 inputs the radio signal to the reception circuit (RX) 103. The reception circuit 103 mixes the radio signal with the local oscillation signal output from the intermediate-frequency synthesizer (SYN) 104, thus performing frequency conversion (down-conversion) on the radio signal, or converting the radio signal to an intermediate-frequency signal.

The reception circuit 103 outputs a received baseband signal obtained by subjecting the intermediate-frequency signal to quadrature modulation. Note that the frequency of the local oscillation signal output from the intermediate-frequency synthesizer 104 is designated by a control signal supplied from a main control module 111, which will be described later.

The received base-band signal is input to the COMA-signal processing unit 106.

The COMA-signal processing unit 106 has a RAKE receiver.

The RAKE receiver performs inverse diffusion on the plurality of paths contained in the received baseband signal, by applying diffusion codes. The signals on the respective paths, each subjected to the inverse diffusion, are first matched in phase and then synthesized. Received packet data of a specific transmission format is thereby generated.

The received packet data is input to the compander 107. The compander 107 includes a multiplex separating unit (not shown). The multiplex separating unit separates the received packet data into media data items (various types of data). The media data items are decoded, one by one. If the received packet data contain audio data, the audio data will be decoded by a speech codec (not shown). If the received packet data contain video data, the video data will be decoded by a video codec (not shown, both of).

Thus, the compander 107 generates a digital audio signal and a digital video signal. The digital audio signal is input to the PCM codec 108. The digital video signal is input to the main control module 111. The received packet data may contain text data such as mail. In this case, the text data is saved in a storage unit 113 via the main control module 111.

The PCM codec 108 performs PCM decoding on the digital audio signal output from the compander 107, generating an analog audio signal. The analog audio signal is output to a received-call amplifier 109. The received-call amplifier 109 amplifies the audio signal to a prescribed level. The audio signal is output to the speaker 13. The speaker 13 generates sound or music from the audio signal.

The digital video signal output from the compander 107 is supplied to a video RAM (SDRAM), or work memory 129 that will be described later. The work memory (SDRAM) 129 is used, whereby the digital video signal is converted to a signal of a format suitable for display on the liquid crystal display (LCD) panel of the display 12. The signal of this format is transferred to the LCD panel at a predetermined timing. The LCD panel therefore displays the image represented by the video signal input via a LCD drive circuit (not shown).

The text data such as mail is read from the storage unit 113 at a predetermined timing, in accordance with the user's instruction input at the input unit 23. A character conversion unit (not shown) converts the text data to a character string representing the characters or symbols that should be displayed. If necessary, the character string is superimposed on the image played back from the work memory 129. Thus, the character string is supplied, together with the video data, to the LCD panel. The LCD panel therefore displays the image (moving or still image) and the characters or symbols, which are represented by the signals input via the LCD drive circuit (not shown).

If the portable terminal apparatus is set to the answering mode, the main control module 111 stores the audio data and video data, either not decoded yet by the compander 107, in the message recording area provided in, for example, the storage unit 113.

The speech input to the microphone 24 is first amplified to an appropriate level by a transmission amplifier 110 and then encoded into PCM data by the PCM codec 108. The PCM data is input to the compander 107 as a digital audio signal. The main control module 111 causes a video-data processing module 127 to process the video signal, which represents the image photographed by a camera mechanism (later described), either a moving or still image. The video signal processed is input to the compander 107. The text data, such as mail, which is the digital data processed by the video-data processing module 127, is input via the main control module 111 to the compander 107, too.

The compander 107 detects the input sound energy represented by the digital audio signal input from the PCM codec 108. Based on the energy detected, an appropriate data-transmission rate is determined. The digital audio data signal is encoded into a signal of a format that accords with the data-transmission rate determined. Audio data that should be transmitted is thereby generated. Further, the compander 107 encodes the digital video signal output from the main control module 111, generating video data.

The de-multiplex unit (not shown) provided in the compander 107 packetizes the audio data and the video data, generating packet data of a specific transmission format. The packet data thus generated is output to the CDMA-signal processing unit 106. The text data, such as mail, is packetized in the same way, or multiplexed into transmission packet data.

Using the diffusion codes allocated to transmission channels, the CDMA-signal processing unit 106 performs a spectrum diffusion process on the transmission packet data output from the compander 107. The packet data so processed is output to the transmission circuit (TX) 105.

The transmission circuit 105 performs, for example, QPSK digital modulation, on the signal that has been spectrum-diffused in the CDMA-signal processing unit 106, thus generating a modulated transmission signal. The modulated transmission signal is synthesized with the local oscillation signal output from the intermediate-frequency synthesizer 104, or converted, in terms of frequency, to a radio signal having a predetermined frequency.

The radio signal is amplified at a high frequency (in the transmission circuit 105) to the transmission power level designated by the main control module 111, before it is transmitted as a spatial wave from the transmission circuit 105.

The radio signal thus amplified, i.e., a high-frequency signal, is supplied via the antenna duplexer 102 to the antenna. The antenna transmits the radio signal to the base station.

The power for achieving the above-mentioned sequence of processes and for storing or holding the above-mentioned data is supplied through the power supplying terminal 22 (see FIGS. 1 and 2) from the commercially available power supply (not shown) or an external battery device. The power so supplied is accumulated in a battery 114. While the mobile telephone apparatus 1 is operating or whenever necessary, the power accumulated in the battery 114 is supplied, in the form of operating power-supply voltage Vcc, from the power-supply circuit 115 to the other components of the mobile telephone apparatus 1.

The main control module 111 has a central processing unit (CPU) 111a and an I/O port (input/output unit) 111b. The CPU 111a performs a sequence of processes and is used to store and hold data. The I/O port 111b is connected to the CPU 111a. As will be explained with reference to FIG. 4, the main control module 111 can exchange signals with a service system (manager-side host apparatus), as long as it remains connected to the connector (interface) 121 of the external connection unit 21 shown in FIG. 2. The connector 121 can be allocated with signals that can be input and output in accordance with a protocol (not shown), so that the apparatus 1 may communicate, using spatial waves, with the user's personal computer or the user's apparatus, as long as the connector 121 is connected by radio to the modem incorporated in the user's personal computer or the user's apparatus.

The CPU 111a is connected to an external interface 111c and a universal serial bus (USB) port 111d, both provided in the main control module 111.

The external interface 111c is connected to a card slot 131 that is provided outside the main control module 111. The card slot 131 can transfer data between the external interface 111c and, for example, a card-shaped storage medium (semiconductor memory) such as a micro-SD card (trademark) M.

The card slot 131 is used to transfer the video data representing a still or moving image photographed by the camera mechanism (later described) or the video data acquired (downloaded) through communication, to a playback apparatus other than the portable terminal apparatus 1 or to a personal computer, through the micro-SD card M. Alternatively, the card slot 131 may transfer digital coded data (e.g., music data) or video data, either stored in the micro-SD card M, to the mobile telephone apparatus 1. In this case, the portable terminal apparatus 1 can play back music or images.

The USB port 111d is connected to a USB connector 123 provided outside the main control module 111. Hence, various external apparatuses, such as an external storage apparatus and a portable music player, can be connected to the mobile telephone apparatus 1. Any recorder that can be USB-connected can, of course, be connected to the mobile telephone apparatus 1, too. Therefore, video data (moving picture) and the like can be input to the mobile telephone apparatus 1.

The video data representing the image photographed, which a CMOS sensor 25 has received through the imaging lens 11 as data representing the brightness and color of light, is supplied to an input-image processing module 125. The input-image processing module 125 optimizes the white balance, input-γ characteristic, color balance, etc., of the image. The video data so processed is supplied via a video-data processing module 127 to the work memory 129. The work memory 129 temporarily stores the video data. The video data representing the image photographed is transferred from the work memory 129 to the storage unit 113 when the user operates the input unit 23, instructing that the video data should be so transferred. To transmit the vide data as appended image data, the video data is packetize as explained above and then transmitted toward the base station in a specific transmission procedure.

Figure 4:
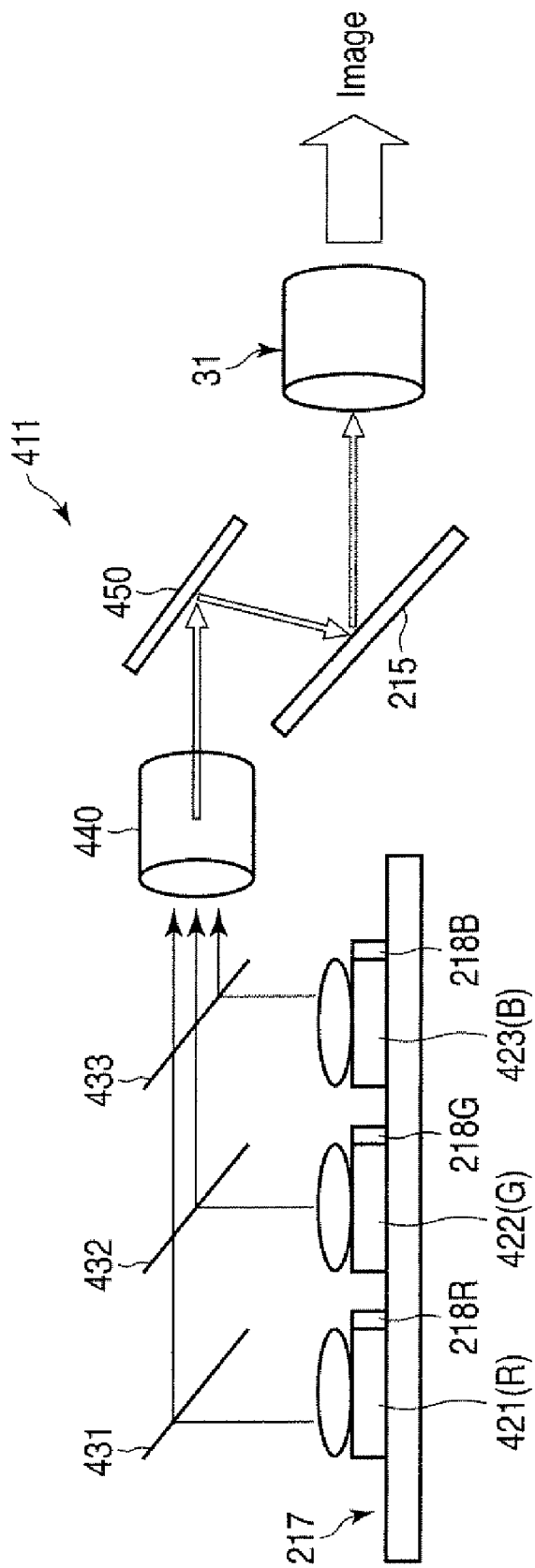
FIG. 4 is an exemplary diagram showing an example of a projection optical system that may be used in the projector (mobile telephone) shown in FIGS. 1 and 2, according to an embodiment of the invention.

The mobile telephone apparatus 1 incorporates a projector module 201. The projector module 201 receives a video signal from the work memory (SDRAM) 129 and a sync signal (SYC) from the main control module 111. In the projector module 201, the video signal and the sync signal are input to a signal processing module 211 and a projector control module 213. The projector module 201 has been designed to be incorporated into the mobile telephone apparatus 1 and used as an image forming module that projects images. The projector module 201 has a digital micro-mirror device (DMD, trademark) element 215. The DMD element 215 performs spatial modulation on illumination light (i.e., a red [R] beam, a green [G] beam and a blue [B] beam), using the video signal, thereby generating a projected image (output image). Note that the illumination light has been emitted from an illumination LED unit 217. The illumination LED unit 217 may be a one-package type that has an LED chip configured to emit R, G and B beams. Alternatively, the illumination LED unit 217 may comprise, as shown in FIG. 4, an LED-R element 421, an LED-G element 422, and an LED-B element 423 that emit R, G and B beams, respectively. In this case, the R, G and B beams are synthesized by a projection optical system 411 (FIG. 4).

The video signal, i.e., video signal for projection, which has been subjected to, for example, resolution conversion in the signal processing module 211, in order to achieve the DMD display, is input to a view-angle conversion module 212. The view-angle conversion module 212 performs view-angle conversion on the video signal, which is supplied to a drive circuit (DMD) 214.

The drive circuit (DMD) 214 controls the respective mirrors provided in the DMD element 215. Further, the drive circuit (DMD) 214 causes a current control module (laser drive circuit) 216 to supply currents to the LED chip or LED elements of the illumination LED unit 217, so that the LED chip or LED elements may emit light beams of predetermined intensities at a desired timing.

The DMD element 215 is configured form an image, using the digital light processing (DLP) scheme proposed by Texas Instruments (TI). In the DMD element 215, the angles of the mirrors are changed in accordance with the R, G and B images, respectively, reflecting the R, G and B beams toward a projection lens 31. The moving picture or still picture, desirable for the user, is therefore projected onto a screen S (or a wall) located at an appropriate distance from the projection lens 31.

Figure 6:
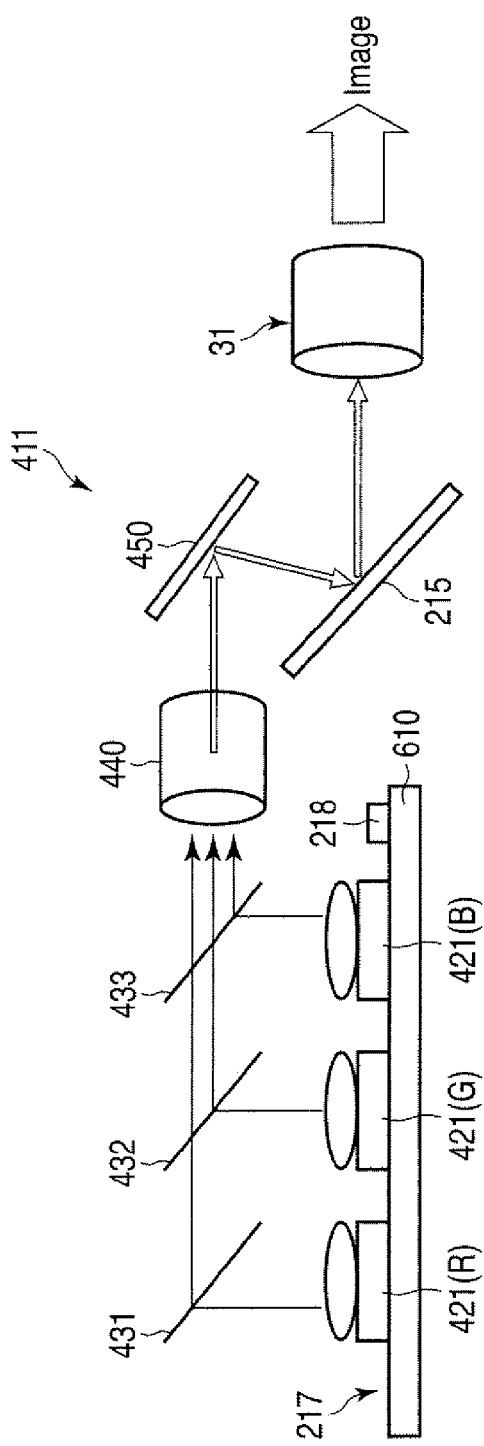
FIG. 6 is an exemplary diagram showing an example of another exemplary projection optical system that may be used in the projector (mobile telephone) shown in FIGS. 1 and 2, according to an embodiment of the invention.
Figure 7:
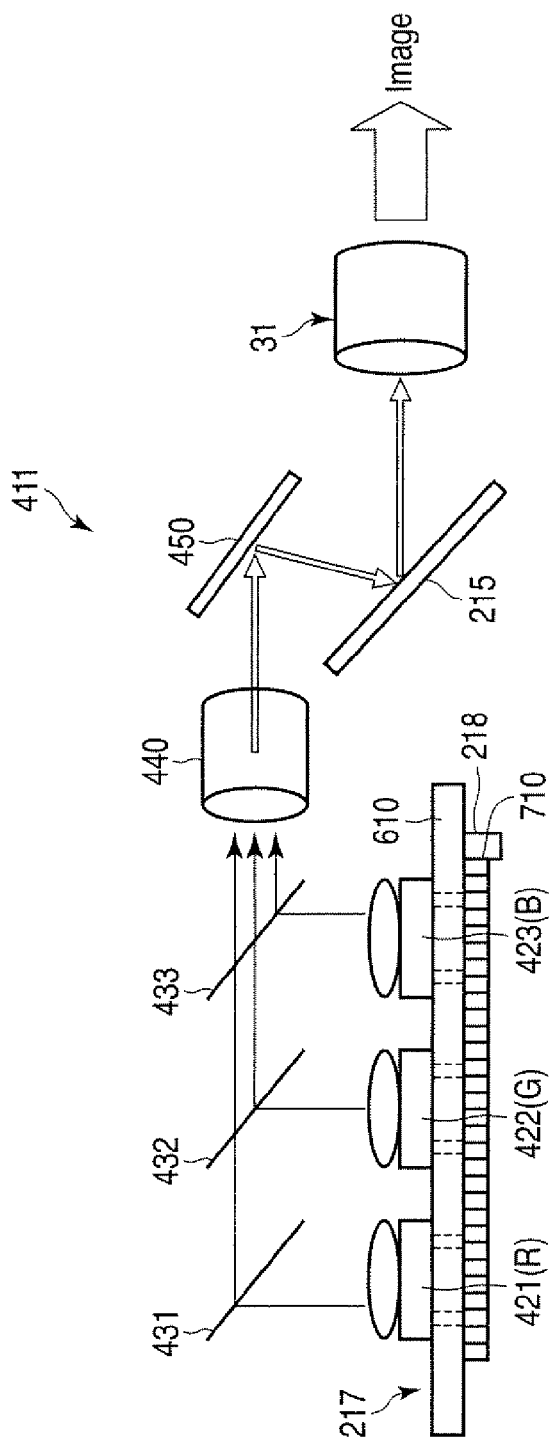
FIG. 7 is an exemplary diagram showing an example of a still another exemplary projection optical system that may be used in the projector (mobile telephone) shown in FIGS. 1 and 2, according to an embodiment of the invention.

A temperature sensor 218 is arranged to monitor the temperature of the illumination LED unit 217, at the LED elements, the LED chip, the substrate holding the LED elements of LED chip, or an appropriate position in the package. If the illumination LED unit 217 has a plurality of LED elements, temperature sensors 218-R, 218-G and 218-B should better be provided for the respective LED elements. If the LED elements or the LED chip is mounted on a substrate 610 as shown in FIG. 6, the temperature sensor 218 may be of the type that detects the temperature of the substrate 610. The LED elements or the LED chip may be thermally connected to a heat sink 710 as shown in FIG. 7. In this case, the temperature sensor 218 is of the type that detects the temperature of the heat sink 710.

The output of the temperature sensor 218 is supplied to a correction value calculation module 220, recognizes as the present temperature in a temperature analysis module 219.

The correction value calculation module 220 analyzes, from the data representing the present temperature and supplied from the temperature analysis module 219, the temperature difference between the LED elements and the deviation from the temperature (reference temperature) equivalent to the color (color reproducibility/hue) preset to the apparatus 1 used as a projector. In accordance with the result of the analysis, the current supplied to each LED, i.e., current control value that accords with a correction value, is set, thereby correcting the current supplied from the current control module 216 to each LED element or the chip. That is, the intensity of light is temperature-compensated, for the light of each color.

As known in the art, the light emitted from each LED element or the chip increases in intensity as the temperature falls and decreases as the temperature rises, as is shown in FIG. 5, in which "1" indicates the intensity the output of the LED element or chip have at the reference temperature (25° C.). The changes in the intensity of the output light may change the color (wavelength of the output light) in some cases. Any change in color influences, particularly the whiteness of the light reproduced by synthesizing the red, green and blue beams.

In most cases, the temperature rise is almost proportional to the time the illumination light is emitted. Hence, the current supplied from the current control module 216 to each LED element or the chip gradually increases. In contrast, the current supplied to each LED element or the chip at the start of projection (i.e., initial phase of driving) is smaller than the current corresponding to the above-mentioned reference temperature. As known in the art, even LED elements that emit light of the same color differ in characteristic. Therefore, the temperature compensation described above is, of course, performed on each LED element or chip of the illumination LED unit 217.

The projector apparatus 1 (mobile telephone apparatus) may have a television tuner (TV reception module). If this is the case, the images of various TV programs or contents can, of course, be projected from the DMD element 215 (incorporated in the projector module 201.

FIG. 4 shows an exemplary configuration the projection optical system 411 may have the illumination LED unit includes LED elements that emit R, G and B beams, in order to guide the beams to the DMD element.

As is evident from FIG. 4, the light beams emitted from the LEDs of the illumination LED unit 217, i.e., the R beam emitted from LED-R element 421, G beam emitted from LED-G element 422 and B beam emitted from LED-B element 423, are almost synthesized in the same optical path, by dichroic mirrors 431, 432 and 433 that allow passage of light beams having different wavelengths. As the synthesized light beam passes through a light pipe 440, the brightness and color (white balance and color balance) are made uniform at the wave front, i.e., a specified region orthogonal to the optical axis. The light beam thus made uniform in brightness and color is reflected by a mirror 450 and guided to a DMD element 215.

In some cases, the mirror 450 can be dispensed with, if the illumination LED unit 217 and the DMD element 215 are optimally arranged.

The current for driving each LED element or the chip is set, as will be explained below.

If the projector module 201 is instructed to project an image, the data representing the ambient temperature detected by the temperature sensor 218 is acquired when the user selects the image (moving or still image) or the text data at the input unit 23 or at the GUI displayed on the display 12. Whether the ambient temperature is higher or lower than the reference value is determined. The ambient temperature may be detected at specific intervals or when the user instructs that the image be projected.

The temperature ambient to the illumination LED unit 217 may be lower than the reference value. In this case, the drive current for the initial phase of image projection is set to a value smaller than the reference value corresponding to the reference temperature, in accordance with the temperature-compensation curve inherent to the LED elements or the chip. On the other hand, the temperature ambient to the illumination LED unit 217 may be higher than the reference value. In this case, the drive current for the initial phase of image projection is set to a value larger than the reference value, in accordance with the temperature-compensation curve inherent to the LED elements or the chip.

As images are projected one after another, the temperature ambient to the illumination LED unit 217 is detected at regular intervals. Every time the ambient temperature is detected, the laser-drive current supplied from the current control module 216 to each LED element or chip of the illumination LED unit 217 is changed in magnitude. In order to synthesize the R, G and B beams, the temperature at a position near the LED chip or the temperature of the LED-B element 423 that has lower luminous efficacy than the LED-R element 421 and the LED-G element 422 may be detected, and the LED-R element 421 and the LED-G element 422 or the LED chip may be corrected in the same way as the LED-B element 423.

Figure 8:
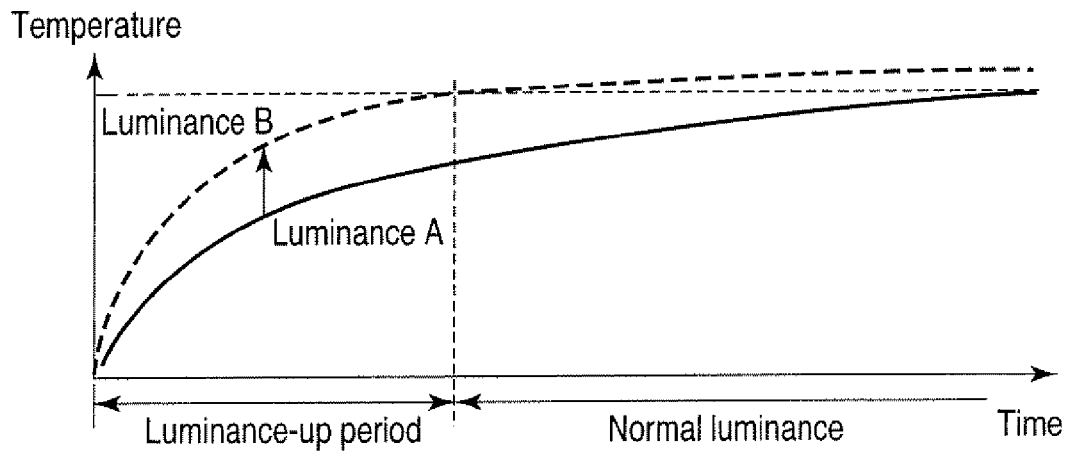
FIG. 8 is an exemplary diagram showing an example of how the luminance that the light emitted from the light source (i.e., LEDs) has at the start of emission change in the mobile telephone shown in FIGS. 1 to 3 if the temperature of LEDs or the ambient temperature thereof is lower than a prescribed value, according to an embodiment of the invention.

FIG. 8 explains how the luminance that the light emitted from the light source (i.e., LEDs) has at the start of emission change in the mobile telephone shown in FIGS. 1 to 3 if the temperature of LEDs or the ambient temperature thereof is lower than a prescribed value.

As clearly seen from FIG. 8, the temperature of the LED light source (i.e., white light source) rises as luminance A increases from the value it has at the start of illumination. In consideration of the lifetime of the LED light source, the temperature of the LEDs must be maintained below a specific temperature T. Therefore, the LED light source is usually so used that the luminance may be saturated at a temperature below the temperature T.

In contrast, immediately after the LEDs are turned on or immediately after the use start of the projector (mobile telephone), the temperature of the LED light source may be lower than the temperature T. In this case, the luminance is set to value B that is greater than the normal luminance, thereby to project a bright image (that is, the luminance of the image projected can be increased).

If the projector is continuously used at the luminance of value B, however, the temperature of the LED light source will exceed the temperature T. The luminance should therefore be set to luminance A when the temperature reaches the temperature T.

Assume that the LEDs are turned off and soon turned on. Then, their temperature may not be low enough. In view of this, the if the temperature is close to the temperature T, the LEDs are turned on at the luminance A, from the very beginning, in accordance with the output of the temperature sensor 218 shown in FIG. 3.

The output of the temperature sensor 218 is monitored at regular intervals. When the temperature detected reaches the temperature T, the drive current (power) supplied to the LEDs is changed to the normal value (a normal rate). The temperature T differs from one LED to another, in most cases. It is therefore desirable to change the drive current back to the value that achieves the luminance A. The temperature of each LED need not be directly measured. Instead, the temperature detected at a position near the LED can, for example, be used change the drive current as shown in FIG. 6 or FIG. 7, if this temperature is proportional to the temperature of the LED.

Figure 9:
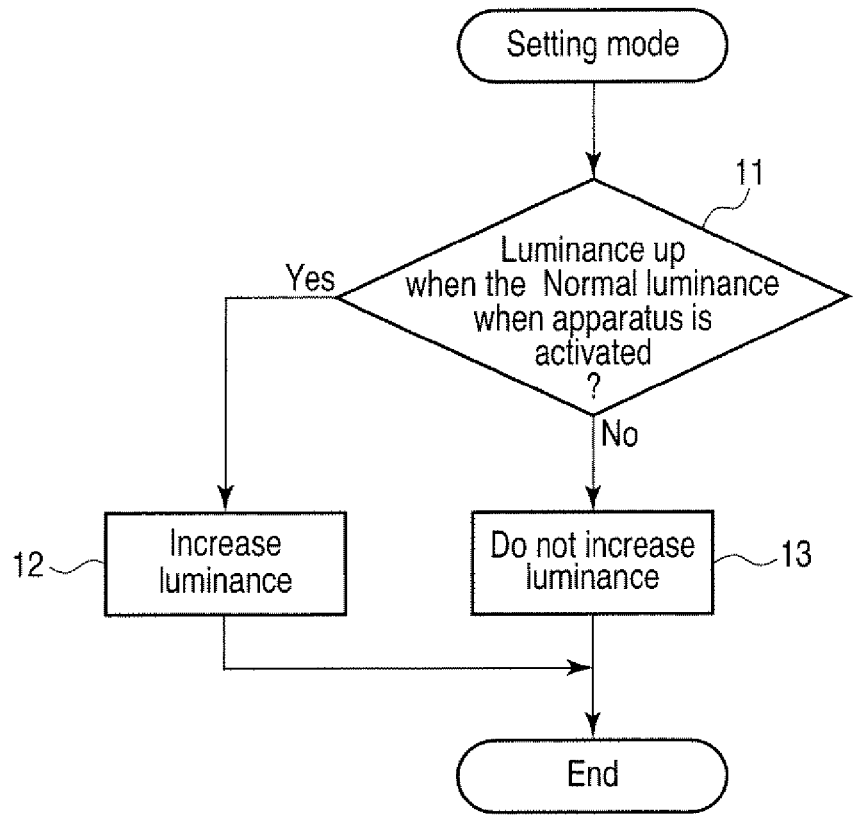
FIG. 9 is an exemplary flowchart explaining an exemplary sequence of setting the projector to the luminance-up mode in which the luminance is increased when the projector is activated, in accordance with the temperature characteristics shown in FIG. 8, according to an embodiment of the invention.

The firmware for the CPU 111*a* incorporated in the main control module 111 may have a mode of turning on the LEDs at luminance B. For example, such a mode-setting function (menu) as shown in FIG. 9 may be performed, enabling the user to instruct that LEDs at low temperature be turned on at high luminance.

More specifically, a message (i.e., luminance-up mode selection message) of "Do you want to increase the LED luminance at the start?" is displayed when the mode-setting function is activated (Block [11]).

If the user selects "YES" in Block 11, the LEDs at low temperature are turned on at high luminance (Block [12]).

If the user selects "NO" in Block [11], the luminance-up mode is not selected, and the LEDs at low temperature are turned on at normal luminance (Block [13]).

FIG. 10 explains an exemplary method of driving the projector, not setting the luminance-up mode in which the luminance is increased when the projector is activated, by utilizing the temperature characteristics of FIG. 8.

First, whether the LEDs have a temperature lower than the temperature (threshold value) T before they are turned on is determined (Block [21]). If the temperature has already reached the temperature (threshold value) T that is, if NO in Block [21], the LEDs are turned on in a normal luminance mode (Block [25]).

Even if the temperature of the LEDs or the temperature at a position near the LEDs (light source) is lower than the temperature (threshold value) T, the LEDs are turned on at the normal luminance (Block 25), unless the luminance-up mode (FIG. 9) is not selected (NO in Block [22]).

Most still images can be well recognized even if they are displayed at a relatively low luminance. Hence, for any still image, the normal luminance mode is selected even if the temperature is lower than the temperature (threshold value) T and the luminance-up mode is selected (set). In this case, the power consumption can be reduced and the lifetime of the LEDs can be preserved. The luminance-up mode can, of course, be set for still images. For example, Block [23] shown in FIG. 10 need not be performed.

FIG. 11 explains an exemplary sequence of terminating the luminance-up mode in which the luminance is increased when the projector is activated, by utilizing the temperature characteristics of FIG. 8, and then starting the normal luminance mode.

First, whether the LEDs have a temperature lower than the temperature (threshold value) T before they are turned on is determined (Block [31]). If the temperature has already reached the temperature (threshold value) T because an image was played back immediately before (that is, if NO in Block [31]), the LEDs are turned on in the normal luminance mode (Block [36]).

A prescribed drive current (power) is supplied to the LEDs (light source). As a result, the temperature of the LEDs starts rising. Upon lapse of a predetermined time, whether the temperature of the LEDs or the temperature at a position near the LEDs is lower than the temperature (threshold value) T by N (N is a positive number) step or steps is determined, or whether the luminance-up mode can be continued is determined (Block [32]).

If the temperature of the LEDs or the temperature at that position has reached to the temperature (threshold value) T (NO in Block [32]), the normal luminance mode is set (Block [36]).

If the temperature of the LEDs or the temperature at that position is much lower than the temperature (threshold value) T (YES in Block [32]), the drive current supplied to the LEDs is reduced by a preset value (Block [33]). The number of steps at which to change the drive current, by the value preset each time is, of course, based on the desired output value of each LED, the power accumulated in the battery, the time required for switching the mode from the luminance-up mode to the normal luminance mode, and the like.

When the drive current supplied to the LEDs is decreased by a one-step value (Block [33], a timer function starts operating. That is, the timer function measures the time elapsing after a drive current of given value set between the luminance-up mode and the normal luminance mode has been supplied to the LEDs. Then, the LEDs are driven by a drive current of the next larger value (Block [34]).

Upon lapse of the time for the one-step, whether the temperature of the LEDs or the temperature at a position near the LEDs has reached the temperature (threshold value) T is determined, or whether the luminance-up mode can be continued is determined (Block [35]). In other words, whether the luminance-up mode should be switched to the normal luminance mode is determined.

If, the luminance-up mode can be continued is determined (NO in Block [35]), Blocks [32] to [35] will be repeated. Note that, Block 33 and Block 34 can performed in reverse order.

If the temperature of the LEDs or the temperature at that position has reached the temperature (threshold value) T, and the luminance-up mode should therefore be terminated (YES in Block [35]), the operating mode is switched to the normal luminance mode and the LEDs are turned on at the normal luminance (Block [36]).

The drive current supplied to the LEDs is thus decreased at regular intervals so that luminance A may be attained at the temperature of temperature (threshold value) T. This can prevent the image brightness from abruptly changing as the luminance-up period ends and the normal luminance period starts. The user can therefore see an image played back and projected, which does not unnaturally change in brightness. As explained with reference to FIG. 10, the luminance-up mode may not be selected for still image, regardless of the temperature of the LEDs or the temperature at a position near the LEDs. In this case, the type of the file, e.g., "still image" is designated at any time after Block [32] and before Block [34].

As has been described, an embodiment of this invention can control the color fluctuation of a projected image and the intensity fluctuation thereof on the axis and at peripheral parts, which result from temperature changes caused by changes of output light intensity. The embodiment can therefore provide projected images having high color reproducibility.

Further, the brightness of the projected image, or the brightness on the screen, need not be measured at all. This can render the apparatus small and reduce the manufacturing cost of the apparatus.

Moreover, having an LED light source, the projector can play back high-resolution images formed by the DLP scheme that uses a DMD element. The projector can be incorporated in, for example, mobile telephone apparatuses. If incorporated in a mobile telephone, the projector can project a moving or still image onto a screen, either photographed by the camera function provided in the telephone. Not only the user of the mobile telephone apparatus, but also some other persons can enjoy viewing the image thus projected onto the screen.

Furthermore, the drive current supplied to the LEDs of the light source incorporated in the portable electronic apparatus is increased to the output luminance of the light source if the temperature of the LEDs or the temperature at a position near the LEDs is lower than a threshold value when the LEDs are turned on. The luminance of the image being projected can therefore increase immediately after the LEDs are turned on. Thus, an image can be played back at high brightness within a relatively short time from the time the LEDs are turned on.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The embodiment of the invention is not limited to the embodiments described above and can be modified in various manners without departing from the spirit and scope of the invention. For example, the embodiment of the present invention can provide a mobile phone apparatus including: light source configured to emit light and including light-emitting elements; an image forming module configured to perform spatial modulation on light beams of different color components, emitted by the light source, in accordance with video data items corresponding to the color components, thereby forming an image consisting of the color components; a temperature detecting module configured to detect the temperature of the light-emitting elements or the temperature at a position near the light-emitting elements; a light-source drive module configured to correct the intensity of each color component emitted by the light source emits, in accordance with the temperature detected by the temperature detecting module; and a projection optical system configured to project the image formed by the image forming module toward a screen.

The embodiment of the present invention can also provide to a method of displaying images including: acquiring the temperatures of a light source configured to emit light or the temperature at a position near the light source; increasing a drive current supplied to the light source to a value greater than a reference value, for a prescribed time after the start of supplying the drive current, in accordance with the temperature acquired of the light source; gradually decreasing a rate of increasing the drive current over the reference value, during the prescribed time; and suppressing a decrease in the brightness of the image, immediately after the image has been projected.

What is claimed is:

1. A projector apparatus comprising:
   a light source configured to emit light;
   a temperature detecting module configured to detect the temperature of the light source, which is related to the amount of light emitted from the light source, or the temperature at a position near the light source;
   an image forming module configured to perform spatial modulation on the light emitted by the light source, in accordance with video data, thereby forming an image;
   a light-source drive module configured to increase the drive current supplied to the light source for a prescribed time after the light source has been turned, in accordance with the temperature detected by the temperature detecting module; and
   a projection optical system configured to project the image formed by the image forming module toward a screen.

2. The projector apparatus of claim 1, wherein a drive mode may be set, in which the light-source drive module increases the drive current supplied to the light source for the prescribed time after the light source has been turned, in accordance with the temperature detected by the temperature detecting module.

3. The projector apparatus of claim 1, wherein the drive current supplied to the light source is changed from one prescribed value to another prescribed value for the prescribed time after the light source has been turned, in accordance with the temperature detected by the temperature detecting module.

4. The projector apparatus of claim 1, wherein a drive mode may be set, in which the drive current supplied to the light source by the light-source drive module is increased for the prescribed time after the light source has been turned, in accordance with the temperature detected by the temperature detecting module.

5. The projector apparatus of claim 4, wherein the drive current supplied to the light source by the light-source drive module is changed from one prescribed value to another prescribed value for the prescribed time after the light source has been turned, except for any still image, in accordance with the temperature detected by the temperature detecting module.

* * * * *